(12) United States Patent
Mishimagi

(10) Patent No.: US 7,428,612 B2
(45) Date of Patent: Sep. 23, 2008

(54) MAGNETIC DISK DRIVE AND METHOD FOR CONTROLLING WRITE OPERATION

(75) Inventor: Shigehiro Mishimagi, Kanagawa (JP)

(73) Assignee: Hitachi Global Storage Technologies Netherlands B.V., AZ Amsterdam (NL)

( * ) Notice: Subject to any disclaimer, the term of this patent is extended or adjusted under 35 U.S.C. 154(b) by 246 days.

(21) Appl. No.: 11/282,863

(22) Filed: Nov. 17, 2005

(65) Prior Publication Data

US 2006/0143377 A1    Jun. 29, 2006

(30) Foreign Application Priority Data

Dec. 24, 2004  (JP) .............................. 2004-373002

(51) Int. Cl.
*G06F 13/00* (2006.01)
*G06F 12/00* (2006.01)
(52) U.S. Cl. ........................ 711/113; 711/100; 711/111; 711/112; 711/154
(58) Field of Classification Search ................. 711/100, 711/111, 112, 103, 113, 114, 154
See application file for complete search history.

(56) References Cited

FOREIGN PATENT DOCUMENTS

| JP | 06282944 | * | 7/1994 |
|---|---|---|---|
| JP | 06-282944 | | 10/1994 |
| JP | 11-238319 | | 8/1999 |

* cited by examiner

*Primary Examiner*—Tuan V. Thai
(74) *Attorney, Agent, or Firm*—Townsend and Townsend and Crew LLP; Patrick Duncan

(57) ABSTRACT

Embodiments of the invention reduce the time required to execute an erase command received from the host device and thereby reduce the time that the interface bus to the host device must spend for the command. In one embodiment, a host issues an erase command. Upon receiving the command, a control processor (MPU) registers address information on the area(s) to be erased in a table in a data buffer. Then, the magnetic disk drive copies the table to a dedicated area of a disk medium or a dedicated area of separately provided non-volatile memory in order to hold and use the table even after the drive is restarted after a shutdown. After storing the address information on the area(s) to be erased into the table, the control processor (MPU) causes a hard disk controller (HDC) to send an erase command completion notification to the host.

16 Claims, 4 Drawing Sheets

MAGNETIC DISK DRIVE AND METHOD FOR CONTROLLING WRITE OPERATION

This application claims priority from Japanese Patent Application No. JP2004-373002, filed Dec. 24, 2004, the entire disclosure of which is incorporated herein by reference.

BACKGROUND OF THE INVENTION

The present invention relates to a magnetic disk drive, and more particularly to a method for controlling a write operation to write a command-specified unit of data to each address in a specified user area or the entire user area of a magnetic disk.

When a conventional magnetic disk drive has received a data write command from the host device, it stores the write data block(s) specified by the command into a buffer memory and then sends a command reception completion notification or a command execution completion notification to the host device, as described in, for example, Patent Document 1 (Japanese Patent Laid-open No. Hei 6-282944). Further, when the magnetic disk drive has received from the host device an erase command to write a command-specified unit of data to each address in a specified address range or the entire address range, it does so by writing a single unit of data at a time, and upon completion of the write operation, sends a command completion notification to the host device.

BRIEF SUMMARY OF THE INVENTION

However, according to the above conventional technique, a magnetic disk drive will take a considerable amount of time to complete the writing of the unit data to each address in the entire address range (or address space) after receiving such an erase command from the host device if the memory capacity of the drive is large. This is because the amount of data written to the entire address range increases with increasing memory capacity of the drive. The memory capacity of magnetic disk drives is expected to continue to increase, and hence so does the time that the interface bus to the host device must spend for the erase command. Therefore, it is important to reduce the time required to execute an erase command received from the host device and thereby reduce the time that the interface bus to the host device must spend for the command.

It is, therefore, a feature of the present invention to provide a magnetic disk drive requiring only a short time to execute an erase command and consuming reduced power.

It is another feature of the present invention to provide a method for controlling a write operation capable of reducing the time required for a magnetic disk drive to execute an erase command.

A magnetic disk drive according to an aspect of the present invention comprises: a magnetic disk for storing information; a buffer memory for temporarily storing information read from the magnetic disk; and a control processor capable of checking and rewriting the contents of the buffer memory; wherein when the control processor has received from a host device an erase command to write a command-specified unit of data to each address in a specified address range or the entire address range, the control processor registers the address range or the entire address range in a table set in the buffer memory and then notifies the host device of completion of execution of the erase command.

The address range registered in the table may be indicated by the start address of an area to be erased on the magnetic disk and the number of blocks in the area. Alternatively, the address range registered in the table may be indicated by the start address and the end address of an area to be erased on the magnetic disk.

The control processor may store the table in the magnetic disk after registering the address range in the table, the address range having been specified by the erase command as being targeted for a write operation.

The magnetic disk drive may further comprise nonvolatile memory, wherein the control processor may store the table in the nonvolatile memory after registering the address range in the table, the address range having been specified by the erase command as being targeted for a write operation.

Upon receiving a read command from the host device after having notified the host device of the completion of the execution of the erase command, the control processor may perform steps of: comparing the address range registered in the table and an address range specified by the read command as being targeted for a read operation; if the comparison indicates that there is an overlap between the address range registered in the table and the address range specified by the read command, writing a unit of data to the buffer memory, the unit of data being specified by the erase command; and transferring the written unit of data to the host device as information on the overlapping address range portion.

Upon receiving a write command from the host device after having notified the host device of the completion of the execution of the erase command, the control processor may perform steps of: before notifying the host device of completion of execution of the write command, comparing the address range registered in the table and an address range specified by the write command as being targeted for a write operation; and if the comparison indicates that there is an overlap between the address range registered in the table and the address range specified by the write command, deregistering the overlapping address range portion from the table.

A method according to another aspect of the present invention for controlling a write operation comprises the steps of: from a host device, receiving an erase command to write a command-specified unit of data to each address in a specified address range or the entire address range of a magnetic disk; registering the address range or the entire address range in a table set in a buffer memory; and notifies the host device of completion of execution of the erase command.

The method may further comprise steps of: receiving a read command from the host device after having notified the host device of the completion of the execution of the erase command; comparing the address range registered in the table and an address range specified by the read command as being targeted for a read operation; if the comparison indicates that there is an overlap between the address range registered in the table and the address range specified by the read command, writing a unit of data to the buffer memory, the unit of data being specified by the erase command; and transferring the unit of data to the host device as information on the overlapping address range portion, the unit of data having been written in the buffer memory.

The method may further comprise steps of: receiving a write command from the host device after having notified the host device of the completion of the execution of the erase command; before notifying the host device of completion of execution of the write command, comparing the address range registered in the table and an address range specified by the write command as being targeted for a write operation; and if the comparison indicates that there is an overlap between the address range registered in the table and the address range specified by the write command, deregistering the overlapping address range portion from the table.

The present invention allows a magnetic disk drive to reduce the time required to execute an erase command regardless of its memory capacity.

DETAILED DESCRIPTION OF THE INVENTION

Figure 1:
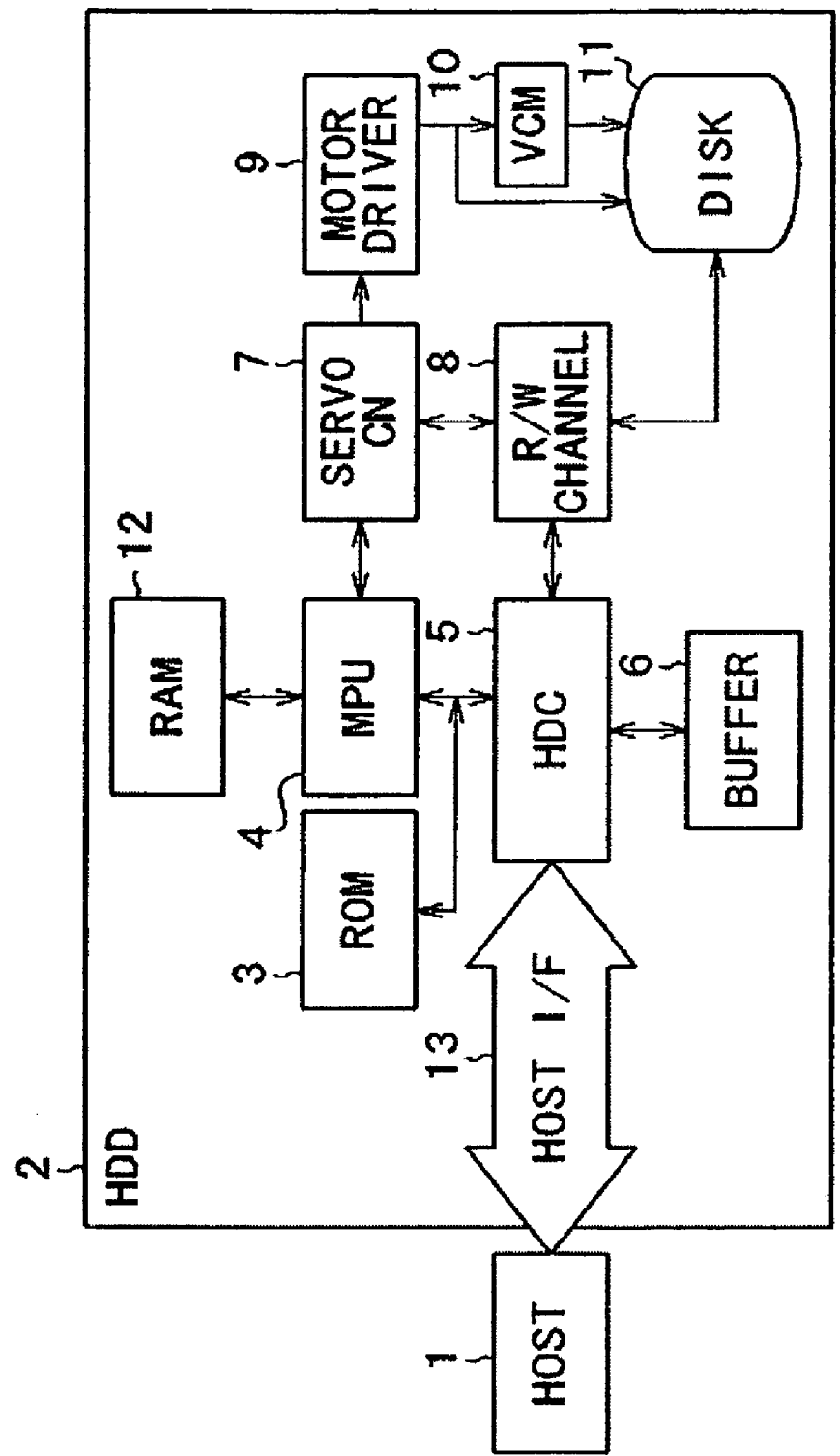
FIG. 1 is a block diagram showing the configuration of a magnetic disk drive according to an embodiment of the present invention.

A specific embodiment of the present invention will be described with reference to the accompanying drawings. FIG. 1 is a diagram showing the configuration of a magnetic disk drive. The magnetic disk drive (HDD) 2 comprises: a program ROM 3 for storing a control program; a control processor (MPU) 4 for executing the control program in the ROM 3; RAM 12 used by the control processor (MPU) 4 to temporarily store numerical values for processing; a data buffer 6 for temporarily storing read/write data, device management information, etc.; a host interface (HOST I/F) 13 for exchanging data between a host 1 (the host device) and the data buffer 6; a hard disk controller (HDC) 5 having a function to transfer data between the data buffer 6 and a disk medium (DISK) 11; a servo controller (SERVO CN) 7 for controlling the movement of the head; a voice coil motor (VCM) 10 for moving the head; a motor driver (MOTOR DRIVER) 9 for controlling the voice coil motor (VCM) 10 and the rotation of the disk medium 11; and a signal processing unit (R/W CHANNEL) 8 connected between the hard disk controller (HDC) 5 and the disk medium 11 to convert digital data into analog data and vice versa. The control processor (MPU) 4 can check or rewrite the contents of the data buffer 6. The host interface 13 is made up of an interface bus.

Figure 2:
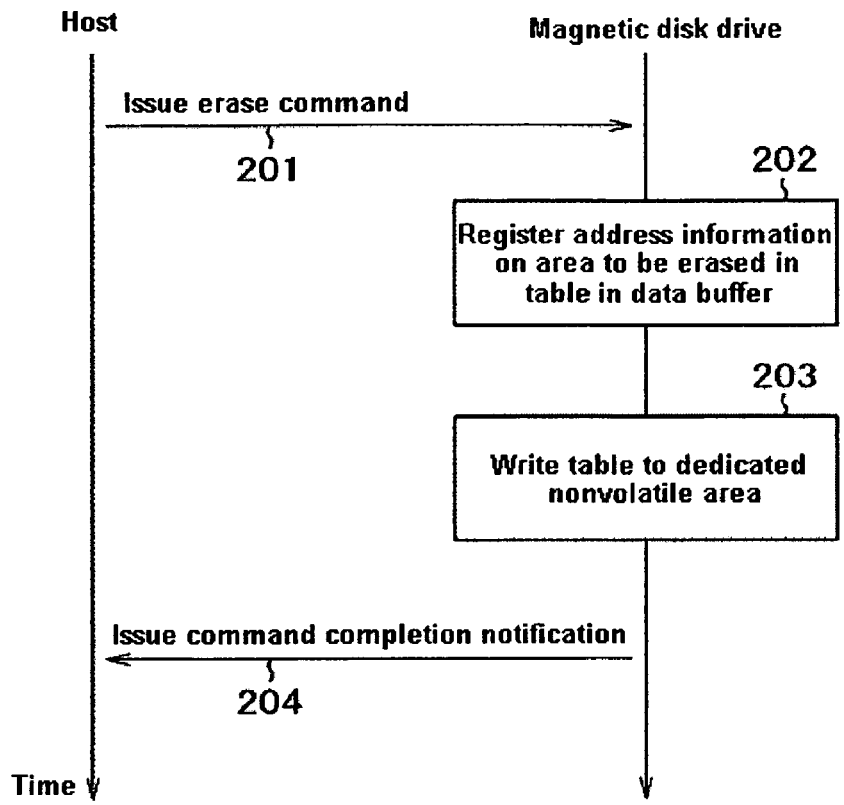
FIG. 2 is a flowchart showing how the magnetic disk drive executes an erase command according to the embodiment.

With reference to FIG. 2, a description will be given of a procedure for executing an erase command sent from the host 1 to the magnetic disk drive 2 instructing the magnetic disk drive 2 to write a command-specified unit of data to each address in a specified address range or the entire address range. The host 1 issues an erase command at step 201. Upon receiving the command, at step 202 the control processor (MPU) 4 registers address information on the area(s) to be erased in a table 300 (see FIG. 3) stored in a dedicated area of the data buffer 6.

Figure 3:
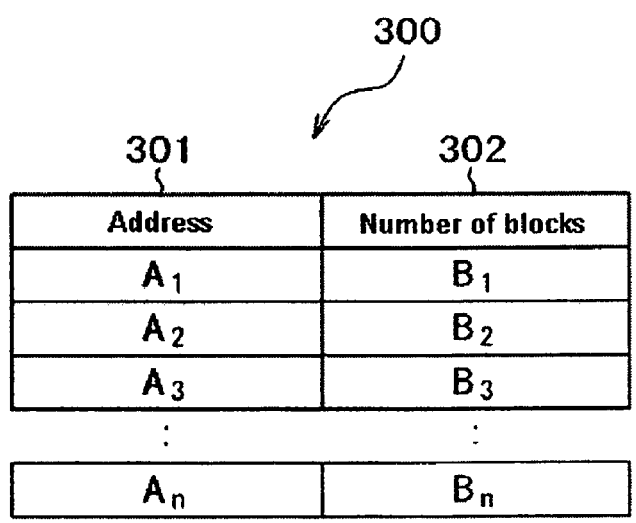
FIG. 3 is a diagram showing the configuration of a table according to the embodiment.

The table 300 lists each continuous area to be erased, separately, as shown in FIG. 3. Specifically, each entry in the table 300 includes: an address field 301 for storing the start address of a continuous area to be erased; and a "number of blocks" field 302 for storing the number of blocks in the continuous area.

After storing the address information on the area(s) to be erased into the table 300, the magnetic disk drive copies the table 300 to a dedicated area of the disk medium 11 or a dedicated area of separately provided nonvolatile memory at step 203 in order to store the table 300 as nonvolatile data.

This allows the magnetic disk drive to hold and check the table 300 even after the drive is restarted after a shutdown.

The reason that the table 300 is also provided in the data buffer 6 is that it is necessary to accommodate the case where the unit of data written to the disk medium 11 or nonvolatile memory for nonvolatilely storing the table 300 is larger than the minimum unit of data handled by the control processor (MPU) 4. The table 300 stored in such a nonvolatile medium must be updated in the unit of data written to it even if the portion to be updated is smaller than the unit of data. Therefore, according to the present embodiment, information in the table 300 (in the nonvolatile medium) is updated in the following manner. The control processor (MPU) 4 first rewrites the table 300 in the data buffer 6 and then copies each unit of data constituting or including the rewritten portion from the data buffer 6 to the nonvolatile medium.

It should be noted that if data can be written to the nonvolatile medium (storing the table 300) in the minimum unit of data handled by the control processor (MPU) 4, the table 300 need not necessarily be provided in the data buffer 6. That is, the data in the nonvolatile medium may be directly updated. After that, the data may be read or rewritten as necessary.

After storing the address information on the area(s) to be erased into the table 300, the control processor (MPU) 4 causes the hard disk controller (HDC) 5 to send an erase command completion notification to the host 1 at step 204.

Figure 4:
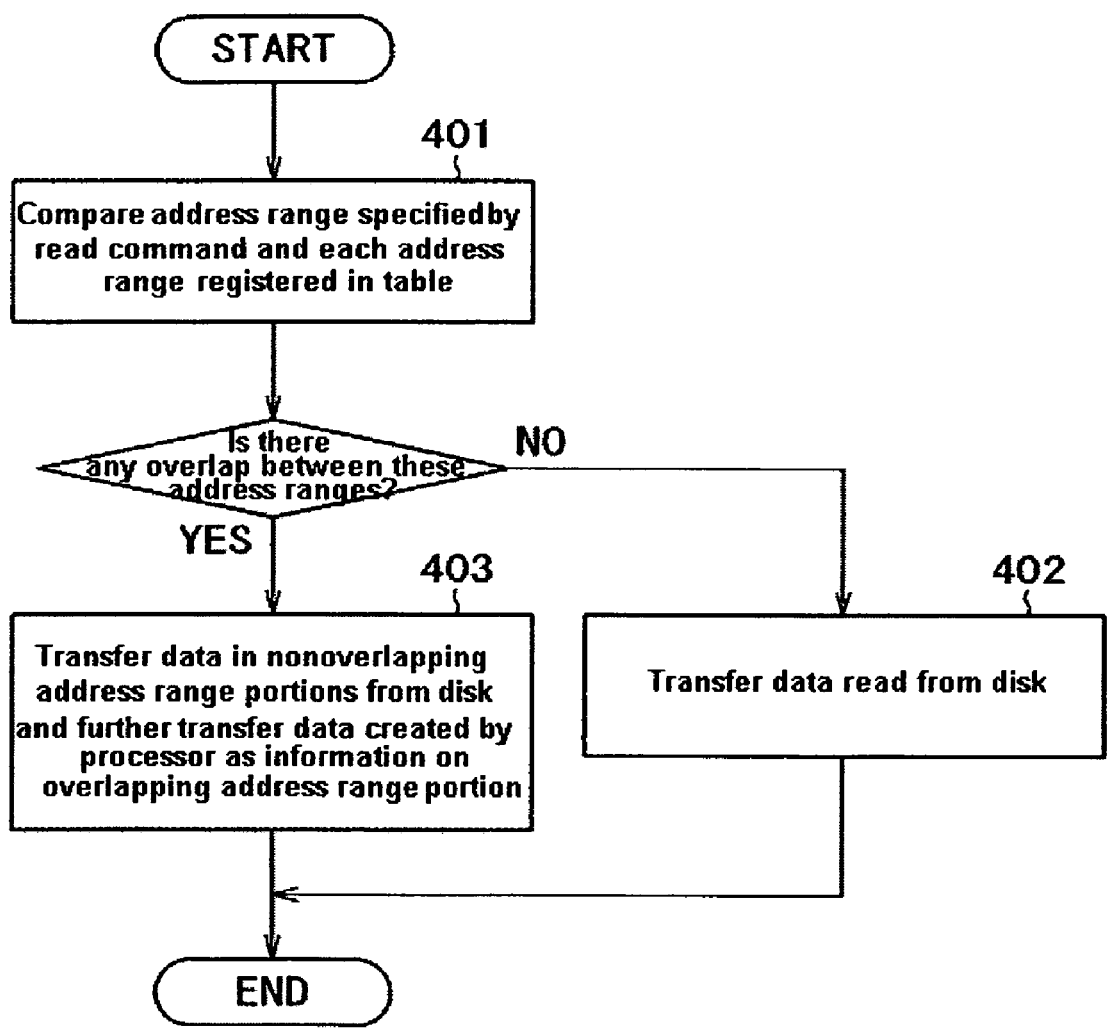
FIG. 4 is a flowchart showing how the magnetic disk drive performs a read operation after having executed an erase command according to the embodiment.

With reference to FIG. 4, a description will be given below of a procedure for executing a read command received after executing an erase command. Upon receiving a read command, the control processor (MPU) 4 checks, through the hard disk controller (HDC) 5, the address range specified by the read command and, at step 401, compares it with each address range registered in the table 300.

If the comparison indicates that there is no overlap between the specified address range and each address range registered in the table 300, the magnetic disk drive reads the data from the disk 11 and transfers it to the host 1 at step 402.

If, on the other hand, the comparison indicates that there is an overlap (full or partial) between these address ranges, the magnetic disk drive reads the data stored in the nonoverlapping address range portions from the disk 11 and transfers it to the host device 1 at step 403. Further at step 403, the magnetic disk drive transfers data created by the control processor (MPU) 4 from the data buffer 6 to the host 1 as the data for the overlapping address range portion. It should be noted that the data to be transferred is specified by the erase command.

Figure 5:
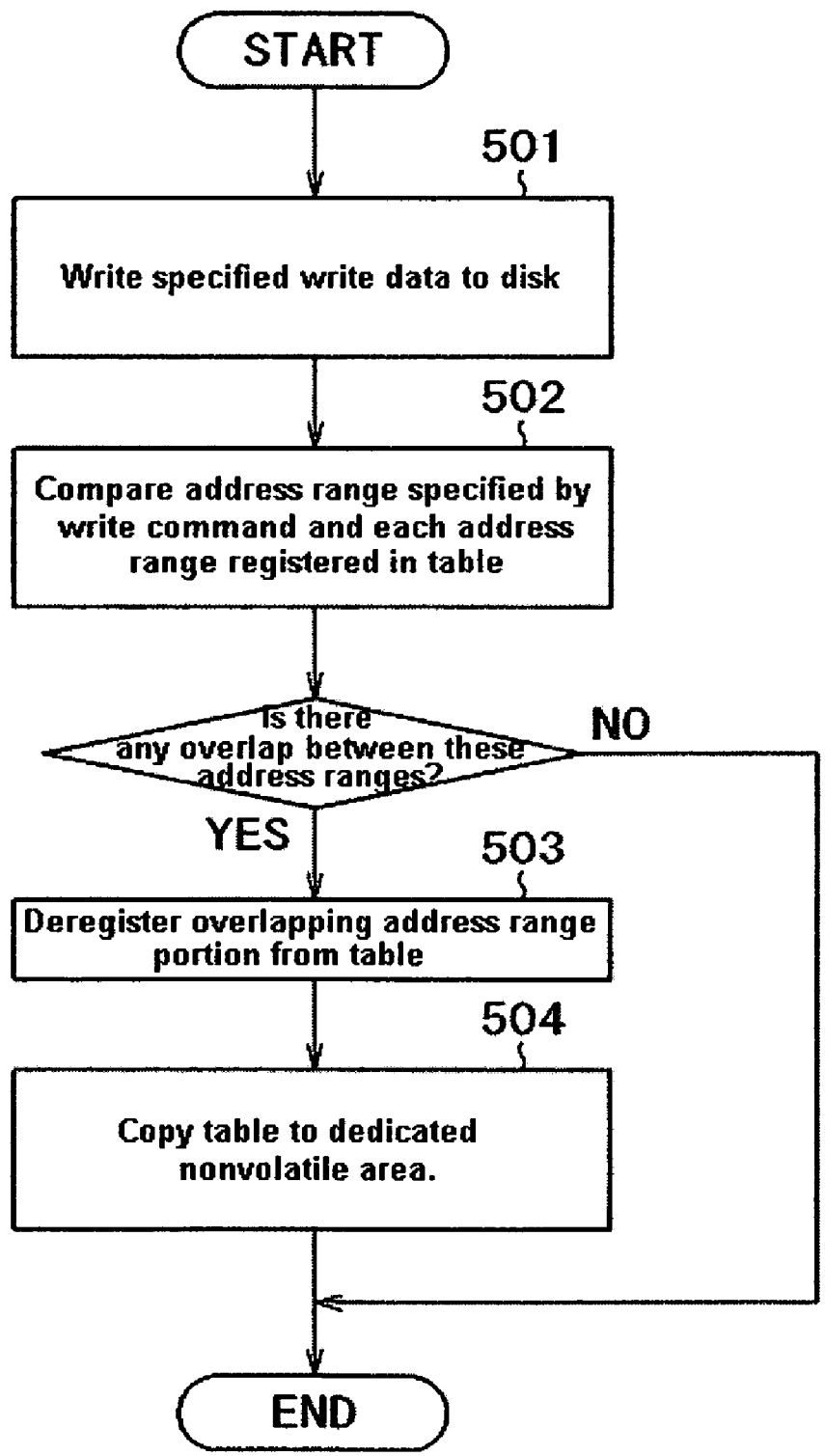
FIG. 5 is a flowchart showing how the magnetic disk drive performs a write operation after having executed an erase command according to the embodiment.

With reference to FIG. 5, a description will be given below of a procedure for executing a write command received after executing an erase command. Upon receiving a write command, at step 501 the control processor (MPU) 4 performs a write operation to the address range specified by the write command and, at step 502, compares the specified address range and each address range registered in the table 300.

If the comparison indicates that there is an overlap between these address ranges, the control processor (MPU) 4 deregisters the overlapping address range portion from the table 300 (in the data buffer 6) at step 503. After that, the control processor (MPU) 4 copies this updated table 300 to the dedicated area of the nonvolatile medium at step 504.

If, on the other hand, the comparison indicates that there is no overlap, the control processor (MPU) 4 neither updates the table 300 nor performs any write operation to the dedicated area of the nonvolatile medium.

It should be noted that even though the present embodiment was described as using the table 300 configured as shown in FIG. 3, it is not limited to this particular table configuration. For example, each entry in the table 300 may include the start and end addresses of a continuous area to be erased. Further, the table 300 need not necessarily be stored in a dedicated area of the disk medium 11 or in nonvolatile memory. The table 300 may be saved in any storage that can store it as nonvolatile data.

As described in detail, the above embodiment of the present invention allows a magnetic disk drive to reduce the time required to execute an erase command regardless of its memory capacity, thereby reducing the time that the interface bus must spend for the command. Further, the magnetic disk drive can reduce the power consumption required to execute the erase command by an amount equal to the power consumption required to perform the write operation to the disk minus the power consumption for the registration with the table. When a device containing a magnetic disk drive is recycled or disposed of, it is customary to erase the data on the disk(s). This means that reducing the execution time of the erase command contributes to reducing the man-hours needed to recycle or dispose of the device.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk drive comprising:
   a magnetic disk for storing information;
   a buffer memory for temporarily storing information read from said magnetic disk; and
   a control processor capable of checking and rewriting the contents of said buffer memory;
   wherein when said control processor has received from a host device an erase command to write a command-specified unit of data to each address in a specified address range or the entire address range, said control processor registers said address range or said entire address range in a table set in said buffer memory and then notifies said host device of completion of execution of said erase command;
   wherein upon receiving a read command from said host device after having notified said host device of said completion of said execution of said erase command, said control processor performs:
   comparing said address range registered in said table and an address range specified by said read command as being targeted for a read operation; and
   if said comparison indicates that there is an overlap between said address range registered in said table and said address range specified by said read command, writing a unit of data to said buffer memory, said unit of data being specified by said erase command; and transferring said written unit of data to said host device as information on the overlapping address range portion.

2. The magnetic disk drive as claimed in claim 1, wherein said address range registered in said table is indicated by the start address of an area to be erased on said magnetic disk and the number of blocks in said area.

3. The magnetic disk drive as claimed in claim 1, wherein said address range registered in said table is indicated by the start address and the end address of an area to be erased on said magnetic disk.

4. The magnetic disk drive as claimed in claim 1, wherein said control processor stores said table in said magnetic disk after registering said address range in said table, said address range having been specified by said erase command as being targeted for a write operation.

5. The magnetic disk drive as claimed in claim 1, further comprising nonvolatile memory, wherein said control processor stores said table in said nonvolatile memory after registering said address range in said table, said address range having been specified by said erase command as being targeted for a write operation.

6. The magnetic disk drive as claimed in claim 1, wherein said control processor performs:
   if said comparison indicates that there is no overlap between said address range registered in said table and said address range specified by said read command, reading data from said magnetic disk and transferring said data to said host device.

7. A magnetic disk drive comprising:
   a magnetic disk for storing information;
   a buffer memory for temporarily storing information read from said magnetic disk; and
   a control processor capable of checking and rewriting the contents of said buffer memory;
   wherein when said control processor has received from a host device an erase command to write a command-specified unit of data to each address in a specified address range or the entire address range, said control processor registers said address range or said entire address range in a table set in said buffer memory and then notifies said host device of completion of execution of said erase command;
   wherein upon receiving a write command from said host device after having notified said host device of said completion of said execution of said erase command, said control processor performs:
   before notifying said host device of completion of execution of said write command, comparing said address range registered in said table and an address range specified by said write command as being targeted for a write operation; and
   if said comparison indicates that there is an overlap between said address range registered in said table and said address range specified by said write command, deregistering the overlapping address range portion from said table.

8. The magnetic disk drive as claimed in claim 7, wherein said control processor performs:
   if said comparison indicates that there is no overlap between said address range registered in said table and said address range specified by said write command, conducting no updating of said table.

9. A method for controlling a write operation of a magnetic disk drive, comprising:
   from a host device, receiving an erase command to write a command-specified unit of data to each address in a specified address range or the entire address range of a magnetic disk;
   registering said address range or said entire address range in a table set in a buffer memory; and
   notifying said host device of completion of execution of said erase command;
   receiving a read command from said host device after having notified said host device of said completion of said execution of said erase command;
   comparing said address range registered in said table and an address range specified by said read command as being targeted for a read operation;

if said comparison indicates that there is an overlap between said address range registered in said table and said address range specified by said read command, writing a unit of data to said buffer memory, said unit of data being specified by said erase command; and transferring said unit of data to said host device as information on the overlapping address range portion, said unit of data having been written in said buffer memory.

10. The method as claimed in claim 9, wherein said address range registered in said table is indicated by the start address of an area to be erased on said magnetic disk and the number of blocks in said area.

11. The method as claimed in claim 9, wherein said address range registered in said table is indicated by the start address and the end address of an area to be erased on said magnetic disk.

12. The method as claimed in claim 9, further comprising storing said table in said magnetic disk after registering said address range in said table, said address range having been specified by said erase command as being targeted for a write operation.

13. The method as claimed in claim 9, further comprising storing said table in nonvolatile memory after registering said address range in said table, said address range having been specified by said erase command as being targeted for a write operation.

14. The method as claimed in claim 9, further comprising:

if said comparison indicates that there is no overlap between said address range registered in said table and said address range specified by said read command, reading data from said magnetic disk and transferring said data to said host device.

15. A method for controlling a write operation of a magnetic disk drive, comprising:

from a host device, receiving an erase command to write a command-specified unit of data to each address in a specified address range or the entire address range of a magnetic disk;

registering said address range or said entire address range in a table set in a buffer memory; and notifying said host device of completion of execution of said erase command;

receiving a write command from said host device after having notified said host device of said completion of said execution of said erase command;

before notifying said host device of completion of execution of said write command, comparing said address range registered in said table and an address range specified by said write command as being targeted for a write operation; and if said comparison indicates that there is an overlap between said address range registered in said table and said address range specified by said write command, deregistering the overlapping address range portion from said table.

16. The method as claimed in claim 15, further comprising:

if said comparison indicates that there is no overlap between said address range registered in said table and said address range specified by said write command, performing no updating of said table.

\* \* \* \* \*